US012618686B2

(12) United States Patent
Ando et al.

(10) Patent No.: US 12,618,686 B2
(45) Date of Patent: May 5, 2026

(54) ONBOARD INFORMATION PROCESSING DEVICE, AUTONOMOUS DRIVING SYSTEM, AND ONBOARD SYSTEM

(71) Applicant: Hitachi Astemo, Ltd., Hitachinaka (JP)

(72) Inventors: Koichi Ando, Tokyo (JP); Keisuke Ampo, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 26 days.

(21) Appl. No.: 18/573,970

(22) PCT Filed: Mar. 2, 2022

(86) PCT No.: PCT/JP2022/008975
§ 371 (c)(1),
(2) Date: Dec. 22, 2023

(87) PCT Pub. No.: WO2023/276276
PCT Pub. Date: Jan. 5, 2023

(65) Prior Publication Data
US 2024/0295409 A1      Sep. 5, 2024

(30) Foreign Application Priority Data

Jun. 28, 2021      (JP) ................................. 2021-106415

(51) Int. Cl.
*G01C 21/36*          (2006.01)
*B60W 40/02*         (2006.01)
*B60W 60/00*         (2020.01)

(52) U.S. Cl.
CPC ......... *G01C 21/3658* (2013.01); *B60W 40/02* (2013.01); *B60W 60/001* (2020.02)

(58) Field of Classification Search
CPC ... G01C 21/3658; B60W 30/14; B60W 60/00; G08G 1/16
See application file for complete search history.

(56) References Cited

U.S. PATENT DOCUMENTS

| | | |
|---|---|---|
| 2018/0046196 A1 | 2/2018 | Hashimoto et al. |
| 2018/0148052 A1 | 5/2018 | Suto et al. |

FOREIGN PATENT DOCUMENTS

| | | |
|---|---|---|
| JP | 2006-184005 A | 7/2006 |
| JP | 2010-223797 A | 10/2010 |

(Continued)

OTHER PUBLICATIONS

International Search Report with English Translation of International Patent Application No. PCT/JP2022/008975 dated May 24, 2022 (6 pages).

*Primary Examiner* — Helal A Algahaim

(74) *Attorney, Agent, or Firm* — Foley & Lardner LLP

(57)      ABSTRACT

An object of the present invention is to suppress deterioration of comfort of autonomous driving due to on-road parking on a general road. The present invention is a vehicle control system including: a first map storage unit that stores first map information including lane information; a second map storage unit that stores second map information including property information including a store or a facility; a route acquisition unit that acquires a travel route of a vehicle; a property acquisition unit that acquires the property information adjacent to the travel route; and a determination unit that determines a recommended lane based on the property information, in which when the vehicle autonomously travels on a general road, it is possible to prevent deterioration of comfort or cancellation of autonomous driving due to a vehicle stopping on the road, and to notify of recommended travel lane information with increased prediction accuracy by determining whether or not there is a vehicle parked on a road by a combination of a store (static information) and a vehicle speed (dynamic information). In addition, it is possible to operate at low cost without (Continued)

communicating with the outside and without performing off-line map processing or the like.

10 Claims, 8 Drawing Sheets

(56) References Cited

FOREIGN PATENT DOCUMENTS

| JP | 2011-215080 A | 10/2011 | |
| JP | 2018025989 A | * 2/2018 | ...... B60W 30/18163 |
| JP | 2018-087763 A | 6/2018 | |

* cited by examiner

FIG. 8

| STORE ID | STORE NAME | BUSINESS TYPE | LOCATION | BUSINESS HOURS | PRESENCE OR ABSENCE OF PARKING LOT | ON-ROAD PARKING POSSIBILITY (SCORE) |
|---|---|---|---|---|---|---|
| 0001 | AA SHOP | PRIVATELY-OWNED SHOP | · · · | 10:00—20:00 | PRESENT | 0. 1 |
| 0002 | BB STORE | CONVENIENCE STORE | · · · | 13:00—19:00 | ABSENT | 0. 2 |
| 0003 | CC REAL ESTATE | REAL ESTATE | · · · | 11:00—19:00 | ABSENT | 0. 15 |
| · · · | · · · | · · · | · · · | · · · | · · · | · · · |

ONBOARD INFORMATION PROCESSING DEVICE, AUTONOMOUS DRIVING SYSTEM, AND ONBOARD SYSTEM

TECHNICAL FIELD

The present invention relates to a moving object, and particularly, to a driving assistance technology.

BACKGROUND ART

Currently, autonomous driving and driving assistance (information notification to an advanced driver assistance system (ADAS) or a driver) are performed as driving assistance technologies for a vehicle. Here, in a general road, there are many vehicles parked and stopped at a road shoulder of a left lane. For this reason, in a vehicle to which the driving assistance technology is applied, it is desirable to predict on-road parking in advance as early as possible. The prediction makes it possible to take measures such as avoiding traveling in the lane.

A related art in this field includes JP 2006-184005 A (PTL 1). A route guidance system described in PTL 1 includes recommended lane setting processing means that sets a recommended travel lane for each section based on lane information for each road link and guidance route information at an intersection, road situation information acquisition processing means that acquires road situation information indicating a road situation that varies with the presence of an on-road parked vehicle for each road link, and recommended lane determination processing means that changes the recommended travel lane set based on the road situation information. Since the recommended travel lane is changed according to the road situation that changes with the presence of the on-road parked vehicle for each road link, it is possible to reliably guide a preferable lane for the vehicle to travel, and it is possible to appropriately perform route guidance.

CITATION LIST

Patent Literature

PTL 1: JP 2006-184005 A

SUMMARY OF INVENTION

Technical Problem

As described above, PTL 1 describes means that determines a road situation that changes with the presence of an on-road parked vehicle, and changes an appropriate recommended travel lane. However, since the determination method depends on statistical information based on past histories, there are a problem that it cannot be used for a route with limited travel history, a problem of maintenance of a database (statistical information) mounted on an actual machine, and the like.

Therefore, an object of the present invention is to provide a driving assistance technology capable of determining an on-road parking possibility even without travel history.

Solution to Problem

A typical example of the invention disclosed in the present application is as follows. A recommended travel lane of a vehicle on a travel route is specified based on property information of a property close to the travel route of the vehicle. A more detailed configuration is an onboard information processing device including: a map management unit that stores lane information for identifying a travel lane of a travel route and property information indicating a characteristic of a property; a travel route acquisition unit that acquires the travel route of a vehicle; a lane information acquisition unit that acquires the lane information of the acquired travel route; a property information acquisition unit that acquires the property information of the property close to the acquired travel route; and a recommended lane information setting unit that specifies recommended travel lane information for specifying a recommended travel lane for the vehicle based on the acquired property information and the acquired lane information. The present invention also includes an autonomous driving system and an onboard system including the onboard information processing device.

Advantageous Effects of Invention

According to the present invention, it is possible to provide a driving assistance technology based on an on-road parking possibility.

BRIEF DESCRIPTION OF DRAWINGS

FIG. 8 is a diagram illustrating store information used in the first and second embodiments.

DESCRIPTION OF EMBODIMENTS

Hereinafter, embodiments of the present invention will be described. In the present embodiment, a recommended travel lane for a vehicle is specified from a plurality of travel lanes (lanes) based on store information of a store close to a travel route. In the present embodiment, a case where the vehicle travels on a road having two travel lanes as a travel route will be described as an example. In addition, in the present embodiment, the left-hand traffic will be described as an example. In the present embodiment, autonomous driving control of the vehicle is executed according to the specified recommended travel lane.

However, the present embodiment is not limited thereto. For example, as the store information to be referred to, property information including a facility other than a store can be used. The property information is information indicating characteristics of a property. In addition, information for specifying the recommended travel lane may be calculated instead of or in addition to the recommended travel lane. This information includes a recommendation level indicating how much it is recommended. The present invention can also be applied to a travel route (road) of three or more lanes, and can also be applied to the right-hand traffic. Furthermore, the present invention can also be applied to driving assistance called an advanced driver assistance system (ADAS) in addition to the autonomous driving control of the vehicle. Hereinafter, each embodiment of the present invention will be described.

First Embodiment

Figure 1:
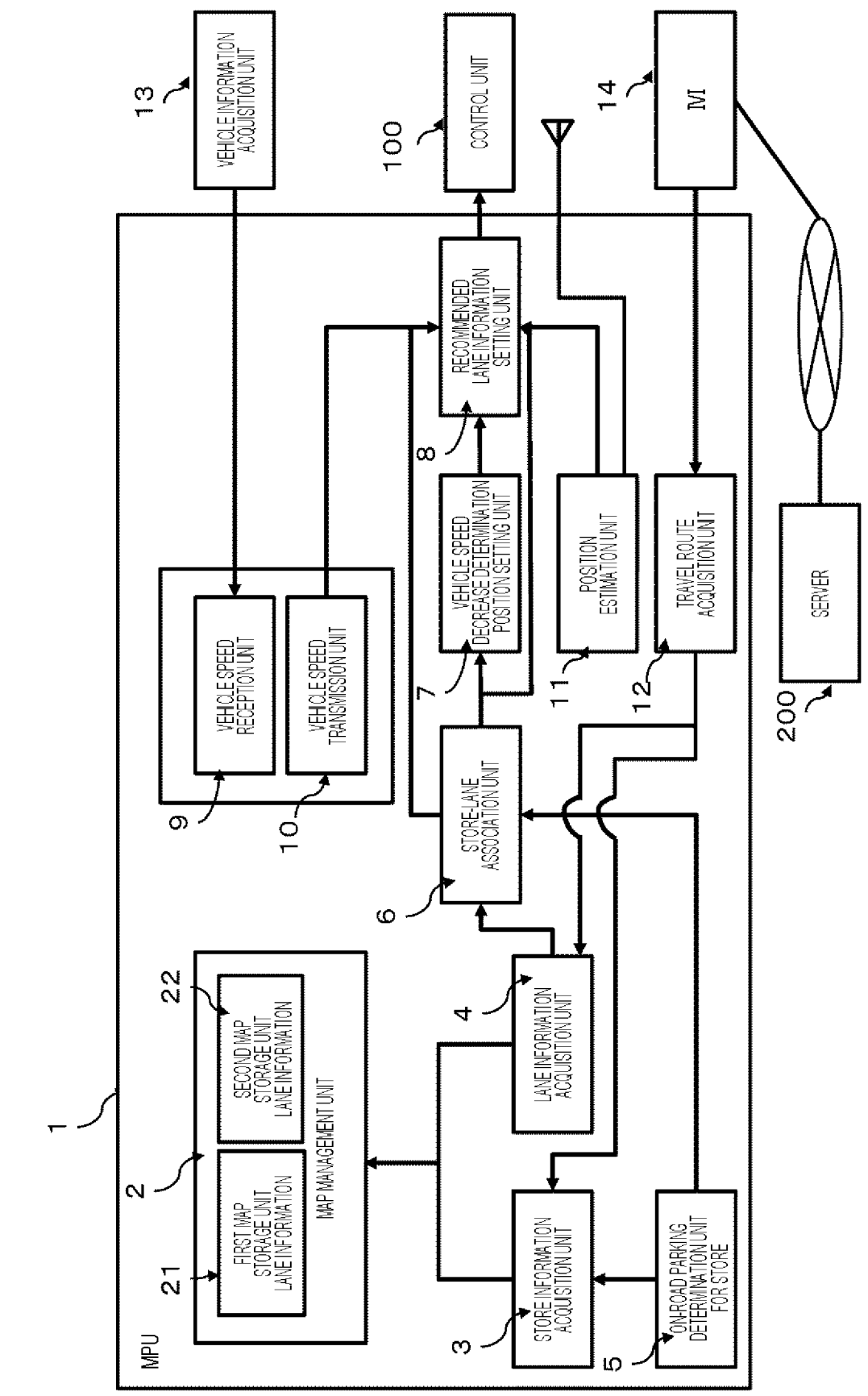
FIG. 1 is a functional block diagram of a vehicle control system including an MPU according to first and second embodiments.

FIG. 1 is a functional block diagram of a vehicle control system including an MPU 1 according to a first embodiment of the present invention. The vehicle control system of the present embodiment includes the MPU 1, a vehicle information acquisition unit 13, an IVI 14 (onboard terminal), and a control unit 100. The vehicle control system is connected to a server 200 via a network. The vehicle control system of the present embodiment is installed in a vehicle to be controlled, and is connected to a server or the like via a network. In FIG. 1, illustration of a vehicle, and an engine, a drive system, and the like included in the vehicle is omitted. The MPU 1 and the control unit constitute an autonomous driving system. Further, the MPU 1 and the IVI 14 constitute an onboard system. Each function and processing of the MPU 1 can be implemented by a program or a dedicated circuit.

Here, the MPU 1, which is an example of an onboard information processing device, includes a map management unit 2, a store information acquisition unit 3, a lane information acquisition unit 4, an on-road parking determination unit 5, a store-lane association unit 6, a vehicle speed decrease determination position setting unit 7, a recommended lane information setting unit 8, a vehicle speed reception unit 9, a vehicle speed transmission unit 10, a position estimation unit 11, and a travel route acquisition unit 12.

Here, the map management unit 2 can be implemented as a so-called storage unit, and includes a first map storage unit 21 that stores lane information for identifying a travel lane, and a second map storage unit 22 that stores store information. In addition, the store information acquisition unit 3 acquires the store information. Further, the lane information acquisition unit 4 acquires the lane information. The on-road parking determination unit 5 determines whether or not on-road parking occurs near the store.

The store-lane association unit 6 associates the travel lane and the store with each other by using the lane information and the store information. The vehicle speed decrease determination position setting unit 7 sets a position for determining a change in vehicle speed of the vehicle (in particular, a decrease in vehicle speed). The recommended lane information setting unit 8 specifies the recommended travel lane or information for specifying the recommended travel lane. The vehicle speed reception unit 9 receives the vehicle speed of the vehicle implemented by a vehicle speed pulse or the like from the vehicle information acquisition unit 13. The vehicle speed transmission unit 10 outputs the received vehicle speed to the recommended lane information setting unit 8. Furthermore, the position estimation unit 11 estimates the position of the vehicle by using a global positioning system (GPS) or the like. Then, the travel route acquisition unit 12 acquires the travel route of the vehicle. For this purpose, the travel route acquisition unit 12 may acquire a planned travel route from a navigation function of the IVI 14.

Further, the MPU 1 is connected to the following external device. The vehicle information acquisition unit 13 is implemented by various sensors. That is, a vehicle speed sensor that detects a vehicle speed pulse, a camera that images an external environment of the vehicle, a radar sensor that detects surrounding obstacles including other vehicles and pedestrians, and the like are included.

The IVI 14 is a so-called onboard terminal, and has the navigation function and a vehicle management function. Further, the IVI 14 outputs various types of information to a driver.

Furthermore, the control unit 100 is connected to a control target such as an engine and outputs a control signal for autonomous driving.

Details of each unit of the MPU 1 will be described below. First, the map management unit 2 includes the first map storage unit 21 that stores the lane information and the second map storage unit 22 that stores the store information. In response to requests from the store information acquisition unit 3 and the lane information acquisition unit 4, the map management unit 2 analyzes map information included in the first map storage unit 21 and the second map storage unit 22, and transmits the map information to the store information acquisition unit 3 and the lane information acquisition unit 4. This transmission also includes reading in response to read requests from the store information acquisition unit 3 and the lane information acquisition unit 4.

The first map storage unit 21 stores highly accurate autonomous driving map information including information regarding each travel lane of a road for autonomous driving. The lane information and the autonomous driving map information may be configured by one piece of information or may be configured by individual pieces of information.

The store information acquisition unit 3 acquires travel route information from the travel route acquisition unit 12, requests the map management unit 2 for the store information stored in the second map storage unit 22 based on the travel route information, and acquires the store information corresponding to the request from the map management unit 2.

In addition, the lane information acquisition unit 4 acquires the travel route information from the travel route acquisition unit 12, requests the map management unit 2 for the lane information stored in the first map storage unit 21 based on the travel route information, and acquires the lane information corresponding to the request from the map management unit 2.

In addition, the on-road parking determination unit 5 for the store acquires the store information from the store information acquisition unit 3, and determines a possibility of occurrence of on-road parking on the road and the lane in front of the store from, for example, a business type and business hours of the store, the presence or absence of a parking lot, and the like. Further, the on-road parking possibility may be set in advance in order to reduce a processing load of the MPU 1. For example, it is possible to store the on-road parking possibility in the store information.

Further, the store-lane association unit 6 acquires the lane information from the lane information acquisition unit 4.

The on-road parking determination unit 5 for the store acquires the store information indicating that there is a possibility of occurrence of on-road parking. The lane information of the lane information acquisition unit 4 and the store information of the on-road parking determination unit 5 for the store are used to associate both pieces of data.

In addition, the vehicle speed decrease determination position setting unit 7 sets position information for determining a decrease in vehicle speed after setting a threshold for the lane information indicating that there is a possibility of occurrence of on-road parking set by the store-lane association unit 6. The position information for determining a decrease in vehicle speed described above is information necessary for correcting the on-road parking possibility determined by the on-road parking determination unit 5 during autonomous driving. Specifically, in a case where the vehicle speed of the own vehicle does not change after passing through the position information for determining a decrease in vehicle speed during autonomous driving, the recommended lane information is corrected.

In addition, the recommended lane information setting unit 8 acquires the lane information indicating that there is a possibility of occurrence of on-road parking set by the store-lane association unit 6, and specifies the recommended lane information. Then, the recommended lane information is set for the lane information. Further, when the vehicle approaches the lane information indicating that there is a possibility of occurrence of on-road parking during autonomous driving, the vehicle speed decrease determination position setting unit 7 acquires the position information for determining a decrease in vehicle speed. Furthermore, self-position information is acquired from the position estimation unit 11. Then, after the vehicle speed is acquired from the vehicle speed transmission unit 10, preset recommended lane information is reset (corrected).

Further, the vehicle speed reception unit 9 acquires vehicle speed information from the vehicle information acquisition unit 13. As described above, the vehicle speed information can be acquired as a vehicle speed pulse. Further, the vehicle speed transmission unit 10 transmits the vehicle speed information acquired by the vehicle speed reception unit 9 to the recommended lane information setting unit 8.

Furthermore, the position estimation unit 11 acquires the position information from a GNSS antenna or the like provided outside the MPU 1. Further, the travel route acquisition unit 12 acquires the travel route from the IVI 14 outside the MPU 1. The acquired travel route information is transmitted to the store information acquisition unit 3 and the lane information acquisition unit 4.

Here, the lane information and the store information of the map management unit 2 will be described. The lane information is information for identifying the travel lane of each road that is the travel route. That is, the travel lane included in each travel route is recorded.

In addition, the store information indicates the characteristics of the store, and includes items that affect the on-road parking possibility. The store information used in the present embodiment is illustrated in FIG. 8. As illustrated in FIG. 8, the store information includes, for each store, a store ID, a store name, a business type, a position, business hours, the presence or absence of parking information, and the on-road parking possibility. Here, the store ID and the store name indicate an identifier and a name of the corresponding store, respectively, and can be omitted. Next, the business type indicates the business type and the type of the corresponding store. The position indicates information indicating the position of the store. This position may be indicated by latitude and longitude, or may indicate a relative position on the travel route.

In addition, the business hours indicate the business hours of the store, that is, available hours. The presence or absence of parking information indicates the presence or absence of a parking lot in the store. These pieces of information represents that the on-road parking possibility increases within business hours, and the on-road parking possibility also increases in a case where there is no parking lot. Therefore, in addition to these items, items that affect the on-road parking possibility may be included in the store information, or at least one of these items may be used. For example, actual past on-road parking history data may be included.

In the present embodiment, the on-road parking possibility is recorded in the store information. The on-road parking possibility recorded in the store information may be a probability calculated based on another item of the store information, or may be a dynamic probability calculated for each time zone.

Since the store information is used to specify the recommended travel lane, the store information is provided for each travel direction of the travel route. That is, it is desirable to manage the store information for each store close to the leftmost (outermost) first travel lane in the travel route. Therefore, the travel route and the travel direction may be recorded for the position of the store information. Being close includes not only abutting onto a road or a sidewalk accompanying the road, but also being installed within a predetermined range from the road.

Figure 2:
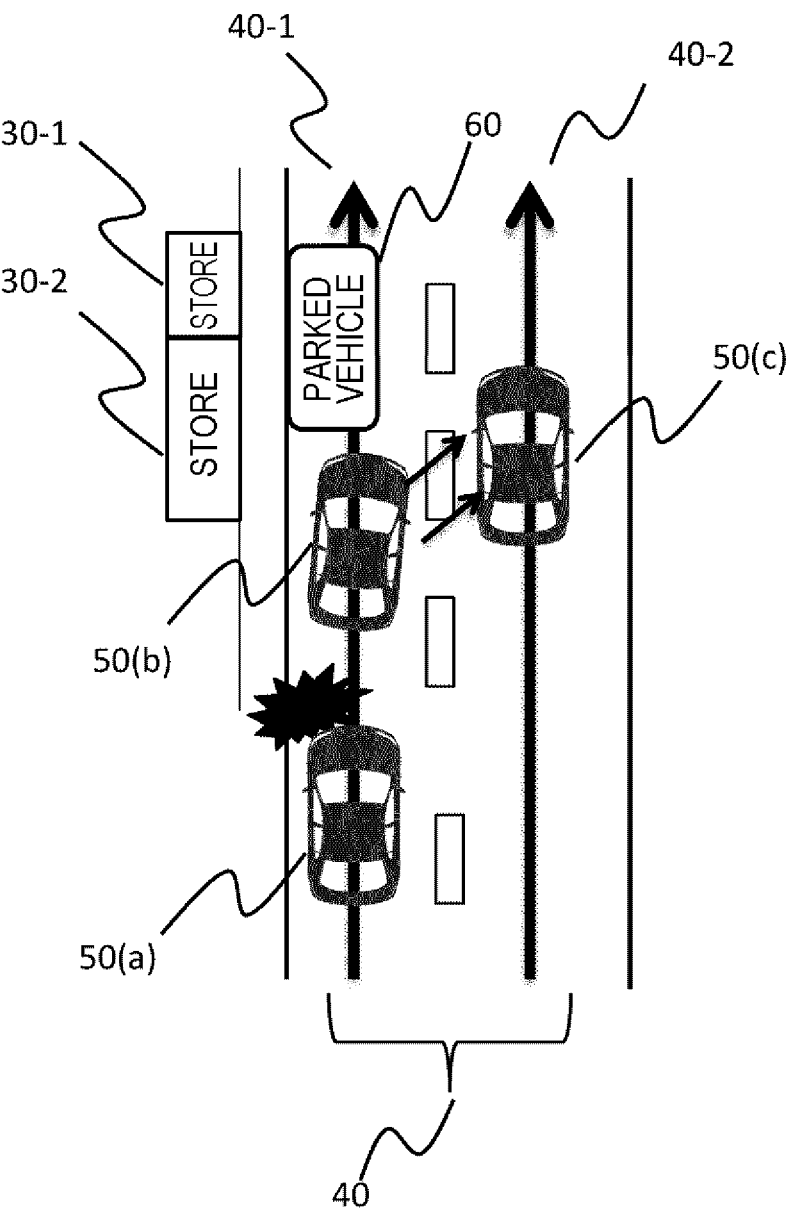
FIG. 2 is a diagram illustrating a situation to which the first embodiment is applied.

The description of the configuration of the first embodiment has been completed, and next, a situation to which the present embodiment is applied will be described. FIG. 2 is a diagram illustrating a situation to which the first embodiment is applied. FIG. 2 illustrates a state in which a vehicle 50 is traveling on a road 40 including a left lane 40-1 which is a first travel lane and an overtaking lane 40-2 which is a second travel lane. An on-road parked vehicle 60 is in front of stores 30-1 and 30-2 along the road 40. In order to avoid the on-road parked vehicle 60, the vehicle 50 travels to 50(*a*), 50(*b*), and 50(*c*) with the lapse of time. At this time, since the vehicle 50 decelerates at 50(*a*) immediately before the on-road parked vehicle 60 or performs a lane change at 50(*b*), it is expected that a traffic jam will occur on the surrounding road.

In the present embodiment, the vehicle 50 autonomously travels in the left lane 40-1 in which there is an on-road parked vehicle 60. Therefore, in the situation illustrated in FIG. 2, not only the comfort of the autonomous driving is impaired, but also cancellation of the autonomous driving function may occur in the worst case. Here, in general autonomous driving control, each lane (the left lane 40-1 and the overtaking lane 40-2) of the road 40 is set as the recommended travel lane. Therefore, in the present embodiment, the recommended lane information is specified in consideration of the predicted situation of the road 40, particularly, the situation of on-road parking. The recommended lane information may be information for specifying the recommended travel lane in addition to the recommended travel lane itself.

Figure 3:
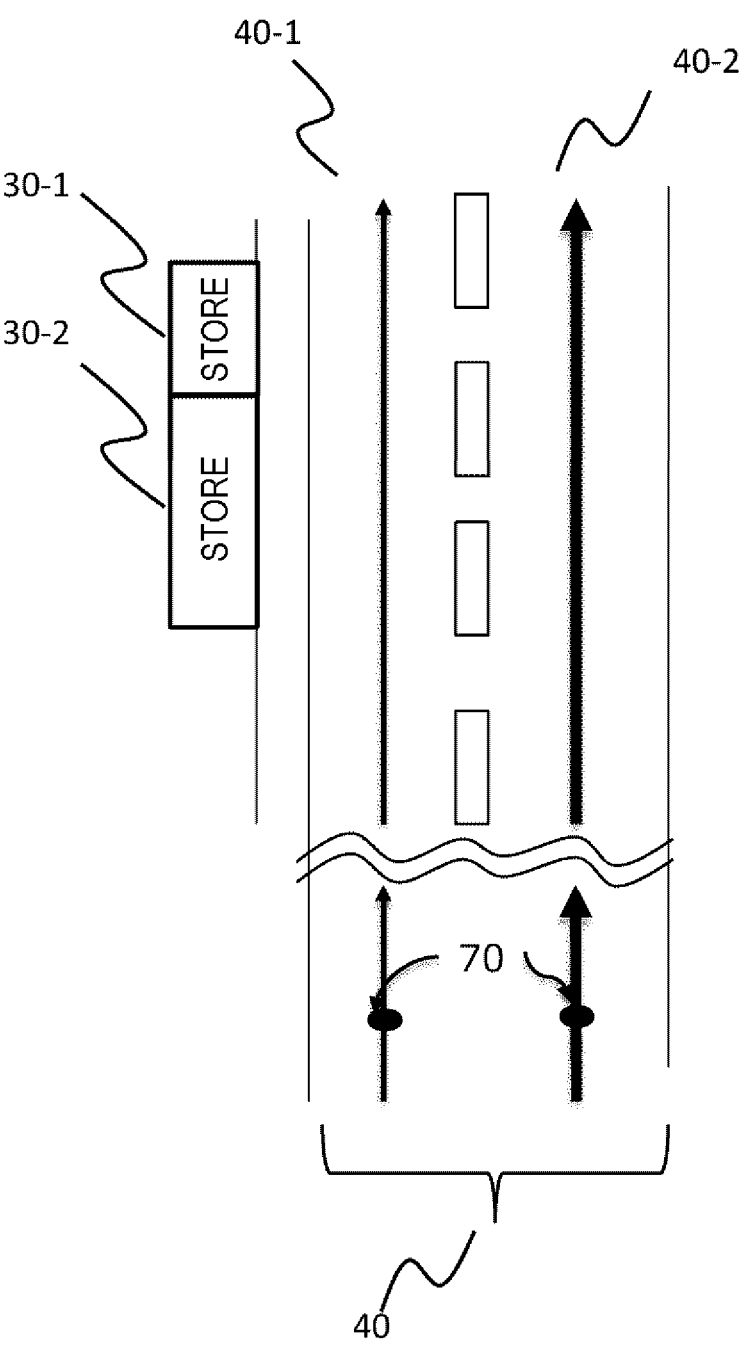
FIG. 3 is a diagram illustrating an outline of processing of setting a recommended travel lane according to the first embodiment.

Next, details of the processing according to the present embodiment will be described. First, FIG. 3 is a diagram illustrating an outline of the processing according to the present embodiment. FIG. 3 illustrates the road 40 similar to that in the application situation illustrated in FIG. 2. That is, the recommended travel lane is specified for the road 40 that includes the left lane 40-1 and the overtaking lane 40-2 and is close to the stores 30-1 and 30-2. The specific outline will be described below.

The MPU 1 illustrated in FIG. 1 acquires the lane information regarding the left lane 40-1 and the overtaking lane 40-2 and the store information regarding the stores 30-1 and 30-2. The MPU 1 specifies a vehicle speed change point 70. Then, when the vehicle passes the vehicle speed change point 70, the MPU 1 specifies the recommended travel lane based on the lane information and the picture store information. In FIG. 3, the overtaking lane indicated by a thicker arrow is specified as the recommended travel lane. Hereinafter, details of the processing will be described with reference to FIG. 3 and the flowchart illustrated in FIG. 4.

Figure 4:
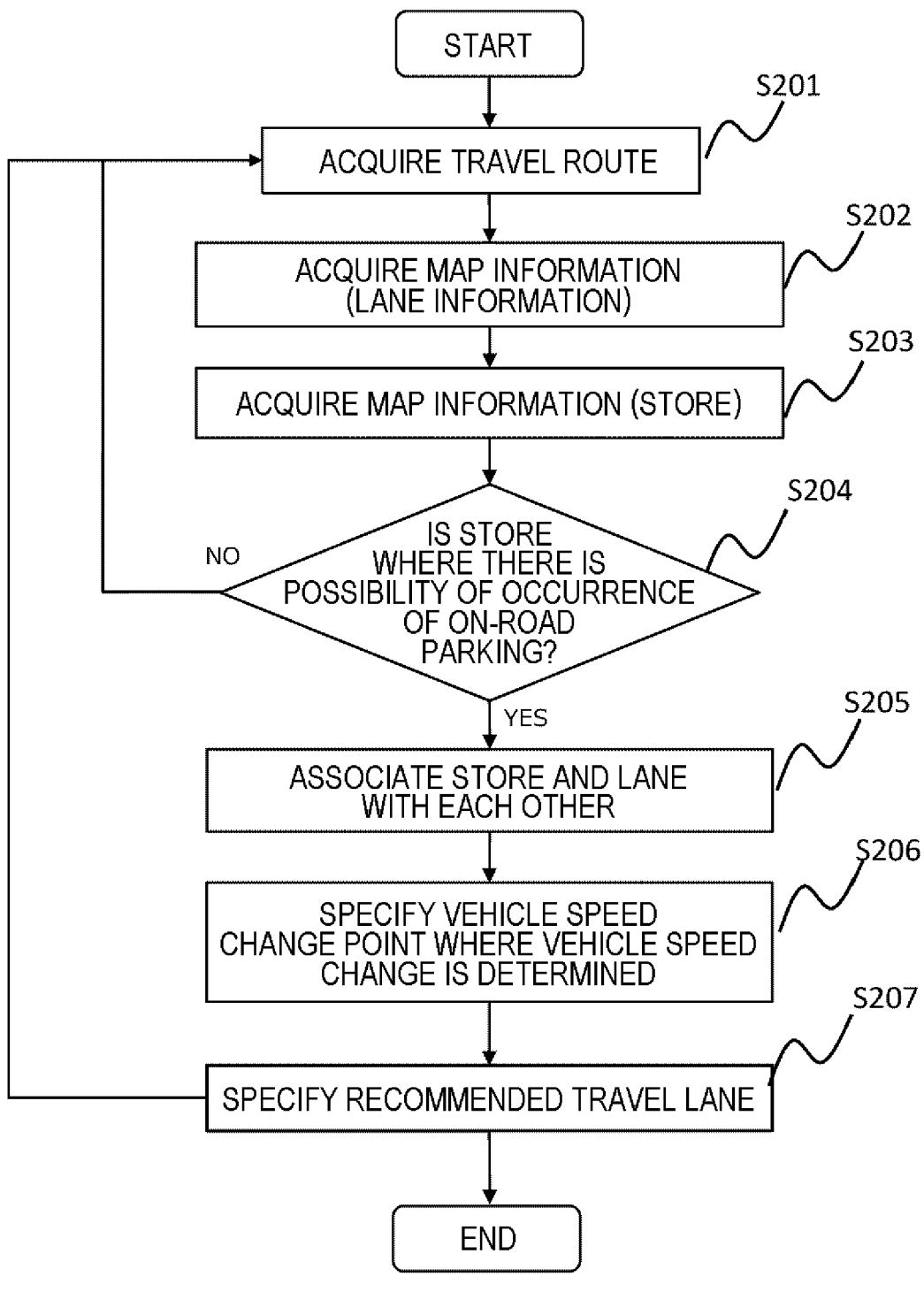
FIG. 4 is a flowchart illustrating details of the processing of setting a recommended travel lane according to the first embodiment.

FIG. 4 is a flowchart illustrating details of the processing of setting the recommended travel lane according to the present embodiment. First, the travel route acquisition unit 12 acquires the travel route (step S201). For example, the travel route acquisition unit 12 receives a guidance route in the navigation function set in the IVI 14. Then, the travel route acquisition unit 12 transmits information specifying the acquired travel route to each of the store information acquisition unit 3 and the lane information acquisition unit 4.

Next, the lane information acquisition unit 4 acquires the lane information corresponding to the acquired travel route from the map management unit 2 (step S202). In addition, the store information acquisition unit 3 acquires the store information corresponding to the acquired travel route position from the map management unit 2 (step S203).

Here, steps S202 and S203 may be performed as follows. Each of the store information acquisition unit 3 and the lane information acquisition unit 4 notifies the map management unit 2 of a request for the map information including the information specifying the acquired travel route. Then, upon receiving the request for the map information, the map management unit 2 acquires and analyzes necessary map information corresponding to the travel route from the first map storage unit and the second map storage unit, then transmits the store information to the store information acquisition unit 3, and transmits the lane information to the lane information acquisition unit 4.

Next, the on-road parking determination unit 5 for the store uses the acquired store information to determine whether or not the store is a store where there is a possibility of occurrence of on-road parking (step S204). As a result, in a case where the store is a store where there is a possibility of occurrence of on-road parking (YES), the processing proceeds to step S205. In addition, in a case where there is no possibility or the possibility is equal to or less than a certain value, the processing proceeds to step S201.

For this reason, the on-road parking determination unit 5 for the store uses the store information illustrated in FIG. 8. That is, the on-road parking determination unit 5 for the store determines a possibility of occurrence of on-road parking on the road and the lane in front of the store based on the business type and business hours of the store, the presence or absence of a parking lot, and the like. Further, the on-road parking determination unit 5 for the store may use the on-road parking possibility (score) illustrated in FIG. 8. Other additional information may be used for this determination. As described above, the on-road parking determination unit 5 for the store may determine that there is a possibility of on-road parking in a case where the score based on the business type of the store or the on-road parking possibility is equal to or more than a preset threshold. In this step, it is desirable that the determination is made for each store, but the determination may be made for each group of a plurality of stores.

Furthermore, in order to reduce the processing load of the MPU 1, a method of thinning out stores for which determination of on-road parking is to be made, or the on-road parking possibility may be calculated in advance by another information processing device such as the server 200. The setting may be made in the second map storage unit. The server 200 connected via the network used as an information processing device in FIG. 1, but a so-called PC may also be used. In this case, the MPU 1 and the PC may be connected by a communication standard based on on-board diagnostics (OBD).

Next, the store-lane association unit 6 acquires the lane information acquired from the lane information acquisition unit 4 and the store information indicating that there is a possibility of occurrence of on-road parking from the on-road parking determination unit 5 for the store, and associates the lane information with the store information (step S205).

Next, the vehicle speed decrease determination position setting unit 7 acquires information in which the lane information and the store information are associated with each other from the store-lane association unit 6. The vehicle speed decrease determination position setting unit 7 specifies the vehicle speed change point indicating the position for determining a decrease in vehicle speed after setting the threshold. Then, the vehicle speed decrease determination position setting unit 7 sets the vehicle speed change point for the lane information (step S206).

Finally, the recommended lane information setting unit 8 specifies the recommended lane information (step S207). For example, in a case where it is determined in step S204 that there is a possibility of occurrence of on-road parking, the recommended lane information setting unit 8 sets the overtaking lane as the recommended travel lane. In addition, in a case where it is determined in step S204 that there is no possibility of occurrence of on-road parking, the recommended lane information setting unit 8 specifies the current lane as the recommended lane information. Alternatively, the recommended lane information setting unit 8 sets the travel lane on which the vehicle travels when passing through the vehicle speed change point 70 as the recommended travel lane. In addition, the recommended lane information setting unit 8 may specify one of the travel lanes set in advance as a prioritized lane, for example, the recommended lane information setting unit 8 may specify the left lane as the recommended travel lane.

Then, the recommended lane information setting unit 8 lane sets the recommended information for the lane information of the first map storage unit. In this way, the processing flow ends, but the processing may transition to step S201 and the processing flow may be repeated until a predetermined condition such as parking of the vehicle is satisfied.

Furthermore, the control unit 100 controls traveling of the vehicle by using the set recommended lane information. This enables autonomous driving control. In addition, the IVI 141 may output guidance information or attention calling information based on the set recommended lane information. These pieces of information are reported to the driver. This is the end of the description of the first embodiment.

Second Embodiment

Next, a second embodiment of the present invention will be described. In the second embodiment, recommended lane information is reset (corrected) according to a traveling situation such as a vehicle speed after passing through a vehicle speed change point 70. The correction is performed in order to cope with a situation different from the situation specified in the first embodiment due to movement of an on-road parked vehicle 60 after passing through the vehicle speed change point 70. That is, whether or not to correct the recommended lane information is determined depending on whether or not the traveling situation satisfies a correction condition. A configuration, lane information, and store information of the second embodiment are similar to those of the first embodiment.

Figure 5:
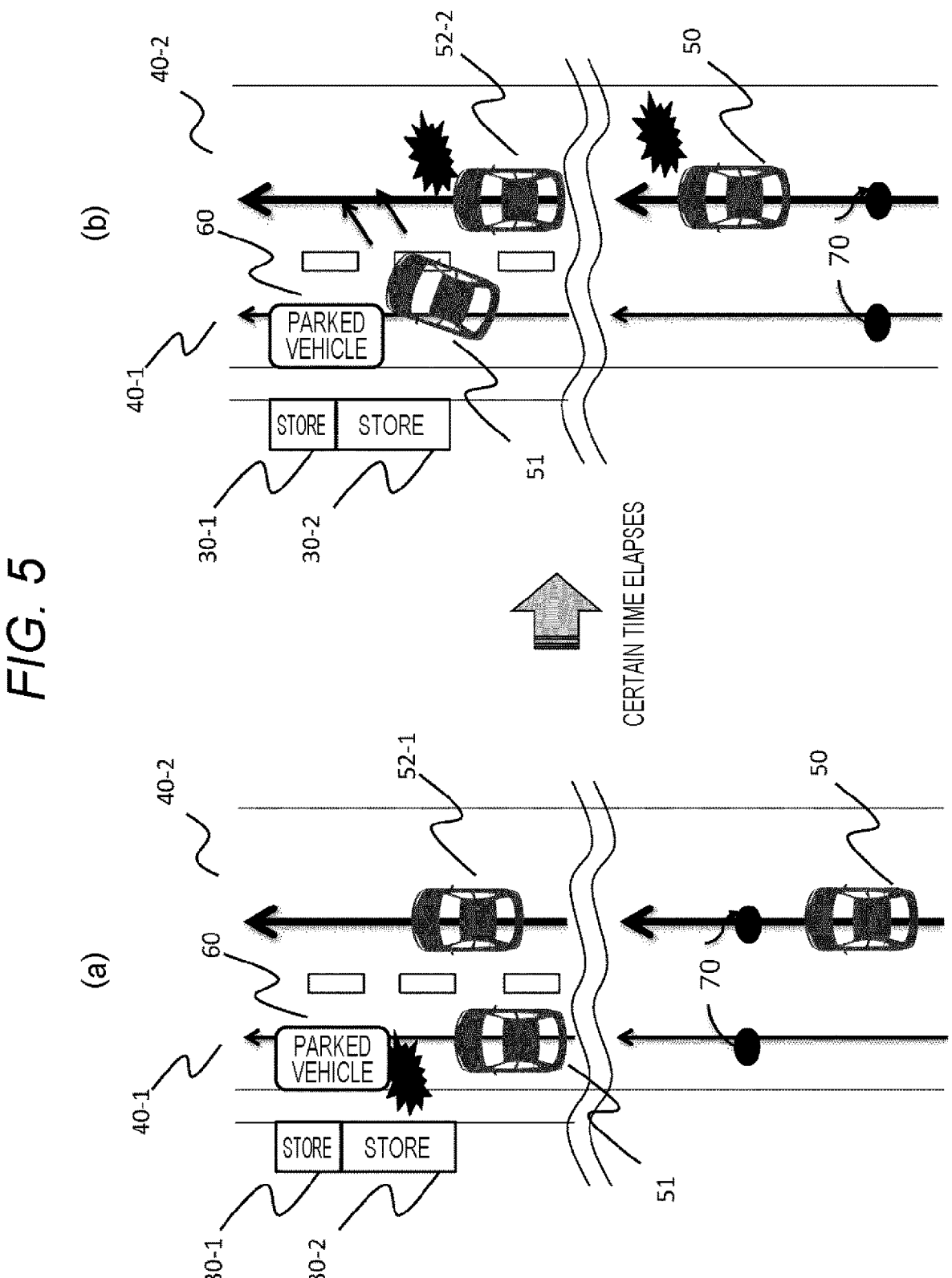
FIG. 5 is a diagram for describing specification of a recommended lane in a case where a vehicle speed of an own vehicle decreases after passing through a vehicle speed change point 70 according to the second embodiment.

First, an outline of processing according to the present embodiment will be described with reference to FIGS. 5 and 6. FIG. 5 is a diagram for describing specification of a recommended lane in a case where a vehicle speed of an own vehicle decreases after passing through the vehicle speed change point 70. In FIG. 5, it is assumed that a vehicle 50 is traveling in an overtaking lane 40-2. In addition, the vehicle 50 travels from bottom to top in the drawing. Furthermore, in the example of FIG. 5, it is assumed that a left lane 40-1 is set as a prioritized lane.

First, in FIG. 5(*a*), the on-road parked vehicle 60 is parked near a store 30-1. Therefore, since a recommended lane information setting unit 8 outputs a setting result indicating that the vehicle 50 is to maintain the overtaking lane 40-2 when passing through the vehicle speed change point 70, the vehicle travels in the overtaking lane 40-2 after passing through the vehicle speed change point 70. In addition, a preceding vehicle 52-1 is traveling in the overtaking lane 40-2 near another vehicle 51.

Then, after a lapse of a certain time from the passage of the vehicle speed change point 70 by the vehicle 50, the situation of FIG. 5(*b*) occurs. In FIG. 5(*b*), the another vehicle 51 performs a lane change from the left lane 40-1 to the overtaking lane 40-2 in order to avoid the on-road parked vehicle 60. Therefore, a preceding vehicle 52-2 of the vehicle 50 decelerates. Therefore, the recommended lane information setting unit 8 suppresses a lane change to the left lane 40-1 that is the prioritized lane, and outputs the recommended lane information for maintaining the overtaking lane 40-2. That is, in the example of FIG. 5, the recommended lane information setting unit 8 determines that it is unnecessary to reset (correct) the recommended lane information.

Next, another example of the second embodiment will be described. When the vehicle speed of the vehicle 50 does not decrease after passing through the vehicle speed change point 70, there is a possibility that the on-road parked vehicle 60 is excluded. In addition, there is a case where a right or left turn is scheduled on a travel route. The specification of the recommended lane information in such a case will be described.

Figure 6:
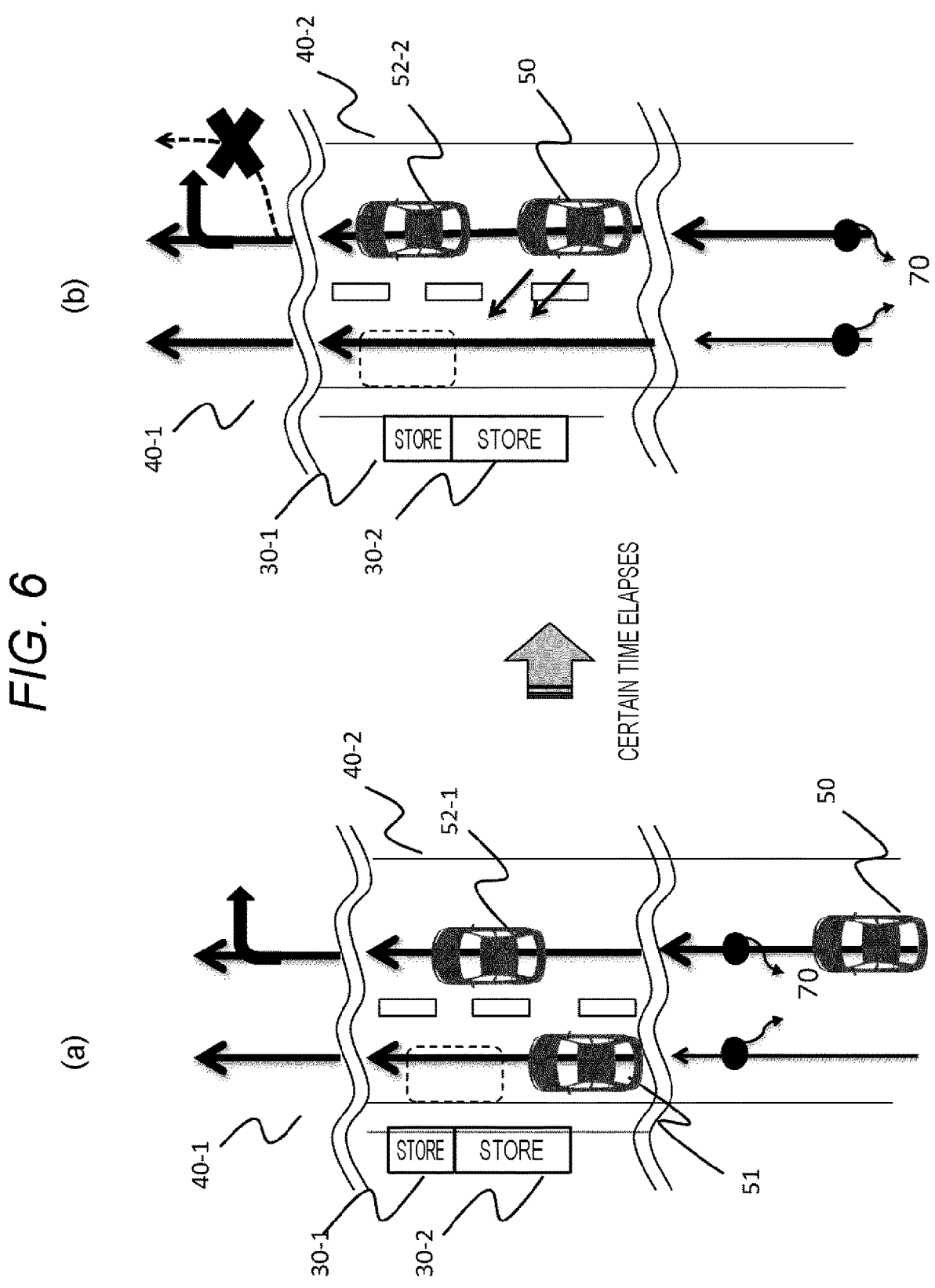
FIG. 6 is a diagram for describing specification of a recommended lane in a case where the vehicle speed of the own vehicle does not decrease after passing through the vehicle speed change point 70 according to the second embodiment.

FIG. 6 is a diagram for describing specification of the recommended lane according to a situation of the travel route and the like even when the vehicle speed of the own vehicle does not decrease after passing through the vehicle speed change point 70 in the present embodiment. Similarly to FIG. 5, FIG. 6 also assumes that the vehicle 50 is traveling in the overtaking lane 40-2. In addition, the vehicle 50 travels from bottom to top in the drawing. Furthermore, also in FIG. 6, it is assumed that the left lane 40-1 is set as a prioritized lane.

First, in FIG. 6(*a*), there is no on-road parked vehicle 60 near the stores 30-1 and 30-2. Therefore, the vehicle speed of the vehicle 50 does not decrease. Therefore, the recommended lane information setting unit 8 sets recommendation levels of the left lane 40-1 and the overtaking lane 40-2 to be the same as each other as the recommended lane information.

Then, after a lapse of a certain time from the passage of the vehicle speed change point 70 by the vehicle 50, the situation of FIG. 6(*b*) occurs. Here, the vehicle speed of the vehicle 50 does not decrease. However, the recommended lane information is corrected in a case where the overtaking lane 40-2 is a right-turn lane and the vehicle 50 travels straight through the corresponding intersection. That is, the recommended lane information setting unit 8 corrects the recommended lane information in such a way as to prioritize the left lane 40-1 based on a situation (right-turn lane) of the overtaking lane 40-2 on which the vehicle is currently traveling and the planned travel route. That is, the left lane 40-1 is set as the recommended travel lane, or the recommended level of the left lane 40-1 is increased. In addition, even in a case where there is no right-turn lane ahead of the travel route, when the left lane 40-1 is set as the prioritized lane, the lane change is possible. Also in this case, the recommended lane information setting unit 8 can correct the recommended lane information as described above.

Figure 7:
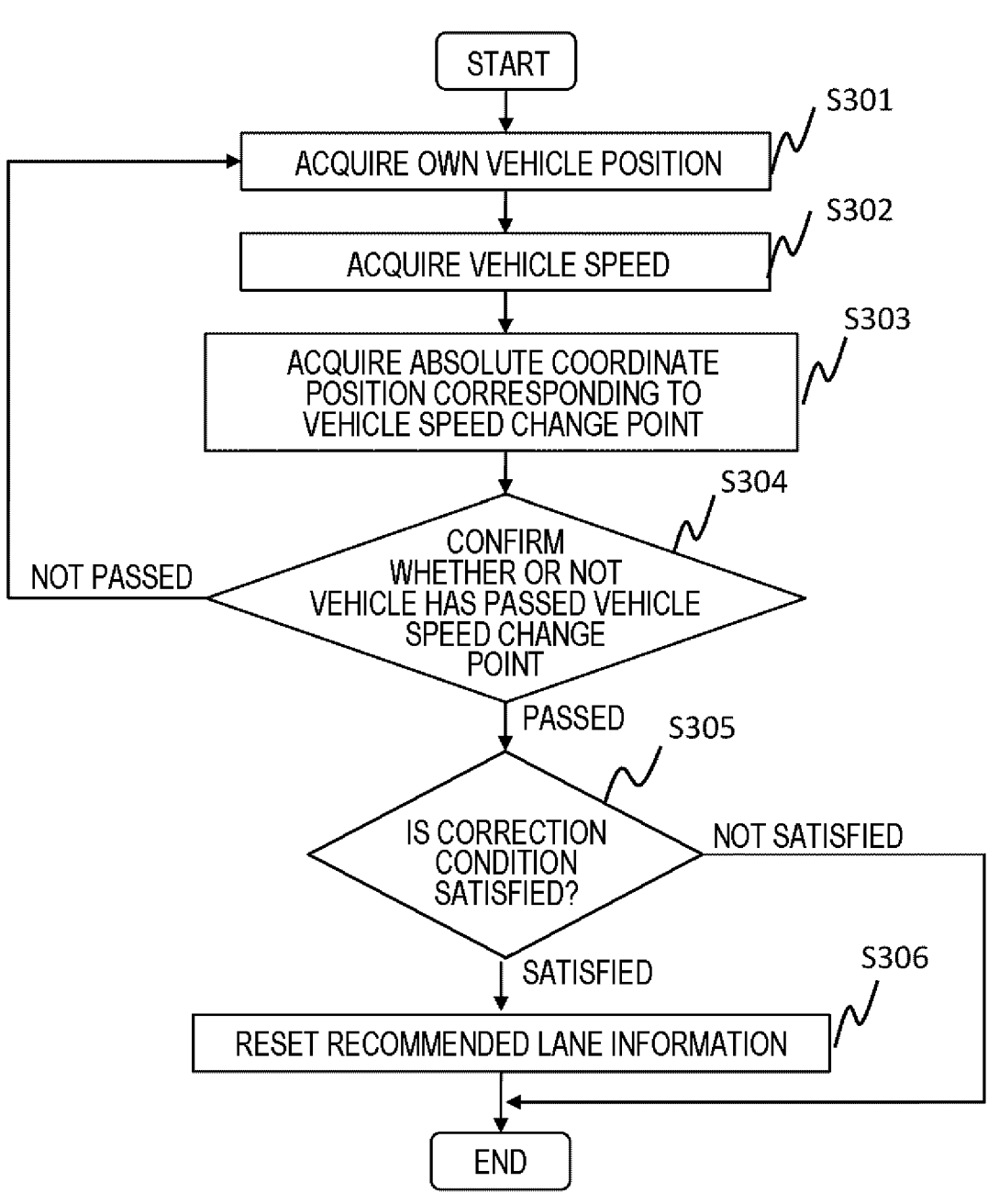
FIG. 7 is a flowchart illustrating details of processing of correcting a recommended travel lane according to the second embodiment.

This is the end of the description of the outline of the processing of the second embodiment, and details thereof will be described with reference to FIG. 7. FIG. 7 is a flowchart illustrating details of the processing of correcting the recommended travel lane according to the second embodiment. First, a position estimation unit 11 acquires own vehicle position information of the vehicle (step S301). Next, a vehicle speed reception unit 9 acquires vehicle speed information indicating the vehicle speed of the vehicle (step S302). Steps S301 and S302 are desirably performed periodically.

Next, the recommended lane information setting unit 8 acquires the vehicle speed change point 70 (step S303). The vehicle speed change point 70 is information indicating a position for determining a decrease in vehicle speed, set by the vehicle speed decrease determination position setting unit 7. Then, the recommended lane information setting unit 8 determines whether or not the vehicle 50 has passed the vehicle speed change point 70 (step S304). As a result, in a case where the vehicle 50 has passed the vehicle speed change point 70, the processing proceeds to step S305. In addition, in a case where the conversion into numbers has not been made, the processing returns to step S301.

Next, the recommended lane information setting unit 8 determines whether or not the traveling situation satisfies the correction condition (step S305). As a result, in a case where the correction condition s satisfied, the processing proceeds to step S306. In addition, in a case where the correction condition is not satisfied, the correction of the recommended lane information is omitted, and the processing flow ends.

Here, the correction condition includes the vehicle speed described in FIG. 5 and the situation of the travel route described in FIG. 6. As for the vehicle speed, a vehicle speed before designated seconds is compared with the latest vehicle speed, and it is determined whether or not there is a change in vehicle speed equal to or more than a threshold. In addition, the situation of the travel route includes the presence of a right/left-turning lane. That is, it is determined whether or not the vehicle is traveling on a travel lane corresponding to the planned travel route. In a case where the vehicle speed is used, the speed of a preceding vehicle or a vehicle in an adjacent lane or a speed difference (relative speed) from a preceding vehicle or a vehicle in an adjacent lane may be used. Furthermore, these deceleration states may be grasped using blinking of a brake lamp of a preceding vehicle or a vehicle in an adjacent lane.

Next, the recommended lane information setting unit 8 resets the recommended lane information (step S306). In the example of FIG. 6, for example, the recommended lane information is reset when a change equal to or more than the threshold cannot be confirmed between the latest vehicle speed and the vehicle speed before the designated seconds, and an intersection with no right-turn lane ahead can be determined from the lane information of the first map storage unit 21.

This is the end of the description of the second embodiment. As described above, in the second embodiment, since the recommended lane information can be corrected, it is possible to perform vehicle control in accordance with the actual situation. According to each embodiment, when the vehicle autonomously travels on a general road, deterioration of the comfort or cancelation of the autonomous driving due to a vehicle stopping on a road is prevented, and whether or not there is a vehicle parked on a road is determined by a combination of the store (static information) and the vehicle speed (dynamic information). As a result, it is possible to notify of a recommended travel lane with improved prediction accuracy. In addition, it is possible to operate at low cost without communicating with the outside and without performing off-line map processing or the like.

REFERENCE SIGNS LIST

1 MPU
2 map management unit
3 store information acquisition unit
4 lane information acquisition unit
5 on-road parking determination unit
6 store-lane association unit
7 vehicle speed decrease determination position setting unit
8 recommended lane information setting unit
9 vehicle speed reception unit 9
10 vehicle speed transmission unit
11 position estimation unit
12 travel route acquisition unit
13 vehicle information acquisition unit
14 IVI
100 control unit
200 server

The invention claimed is:

1. An onboard information processing device for driving assistance for a vehicle traveling on a travel route including a plurality of travel lanes, the onboard information processing device configured to:

store lane information for identifying a travel lane of the plurality of travel lanes of the travel route and property information indicating a characteristic of a property;

acquire the travel route of the vehicle;

acquire the lane information of the acquired travel route;

acquire the property information of the property close to the acquired travel route; and specify recommended travel lane information for specifying a recommended travel lane for the vehicle based on the acquired property information and the acquired lane information; and specify the recommended travel lane according to whether or not a vehicle speed of the vehicle has decreased, wherein the vehicle speed being decreased is indicative of a traveling situation.

2. The onboard information processing device according to claim 1, further configured to specify the recommended travel lane as the recommended travel lane information.

3. The onboard information processing device according to claim 1, further configured to determine that the vehicle speed has decreased in a case where the vehicle speed from a predetermined time has decreased by a predetermined threshold or more when the vehicle has passed through a predetermined vehicle speed change point.

4. The onboard information processing device according to claim 3, wherein the travel route includes at least a first travel lane positioned on an outermost side of the travel route and a second travel lane, and the onboard information processing device further configured to specify the second travel lane as the recommended travel lane in a case where the vehicle is traveling on the second travel lane and the vehicle speed has decreased.

5. The onboard information processing device according to claim 3, wherein the travel route includes at least a first travel lane positioned on an outermost side of the travel route and a second travel lane, and the onboard information processing device further configured to specify each of the travel lanes included in the travel route as the recommended travel lane in a case where the vehicle is traveling on the second travel lane and the vehicle speed does not decrease.

6. The onboard information processing device according to claim 1, wherein the onboard information processing device further configured to specify the recommended travel lane by further using an external environment of the vehicle.

7. The onboard information processing device according to claim 1, wherein the property information includes at least one of a position of the property, an available time, or a presence or absence of parking information.

8. The onboard information processing device according to claim 1, further configured to output the recommended travel lane to an external device.

9. An autonomous driving system, comprising:

the onboard information processing device according to claim 8; and the external device, wherein the external device is a control unit that controls driving of the vehicle.

10. An onboard system, comprising:

the onboard information processing device according to claim 8; and the external device, wherein the external device is an onboard terminal that outputs the recommended travel lane information.

* * * * *